United States Patent [19]

Shishkin et al.

[11] Patent Number: 4,839,047
[45] Date of Patent: Jun. 13, 1989

[54] INTERMITTENT-ACTION APPARATUS FOR FILTERING LIQUID

[76] Inventors: Viktor V. Shishkin, ulitsa Festivalnaya, 16, kv.5; Nikolai F. Kryazhevskikh, ulitsa Krasnykh Partizan, 559, kv.13; Jury P. Shapovalov, ulitsa Turgeneva, 18, all of Krasnodar, U.S.S.R.

[21] Appl. No.: 112,564
[22] PCT Filed: Dec. 17, 1986
[86] PCT No.: PCT/SU86/00133
§ 371 Date: Jul. 24, 1987
§ 102(e) Date: Jul. 24, 1987
[87] PCT Pub. No.: WO87/03822
PCT Pub. Date: Jul. 2, 1987

[30] Foreign Application Priority Data

Dec. 24, 1985 [SU] U.S.S.R. ............... 3988604
Dec. 24, 1985 [SU] U.S.S.R. ............... 3988605
Dec. 24, 1985 [SU] U.S.S.R. ............... 3988612

[51] Int. Cl.⁴ .............................. B01D 33/00
[52] U.S. Cl. .................... 210/356; 210/111; 210/113; 210/354; 210/106; 210/391; 210/398
[58] Field of Search ............... 210/111, 113, 354, 355, 210/356, 106, 391, 398, 399; 55/304, 305; 209/274, 310

[56] References Cited

U.S. PATENT DOCUMENTS

| 34,499 | 2/1862 | Holmes | 209/310 |
| 3,464,561 | 9/1969 | Wrotnowski | |
| 3,931,015 | 1/1976 | Jenkins | |
| 4,131,546 | 12/1978 | Olsson | 210/780 |
| 4,370,153 | 1/1983 | Russell | 55/304 |

FOREIGN PATENT DOCUMENTS

| 2124717 | 2/1974 | Fed. Rep. of Germany |  |
| 2011513 | 1/1987 | Japan | 210/407 |
| 449025 | 6/1936 | United Kingdom | 55/305 |

Primary Examiner—David L. Lacey
Assistant Examiner—Thomas M. Lithgow
Attorney, Agent, or Firm—Ladas & Parry

[57] ABSTRACT

An intermittent-action apparatus for filtering liquid has a sealed casing (1) in which a hollow cylinder (8) is mounted so as to define with the casing (1) an annular space (9) communicating with a system for removing precipitate. A driven drum (12) is provided in the upper part of the casing (1), and one end (11) of a filtering hose (10) is secured to the drum, the other end (13) of the hose being turned inside out and secured along the perimeter to the hollow cylinder (8) so as to define around the remaining part of the hose an annular space (14) for liquid being filtered, the annular space varying in volume during accumulation of precipitate therein and during movement of the hose under the action of the drum.

12 Claims, 5 Drawing Sheets

INTERMITTENT-ACTION APPARATUS FOR FILTERING LIQUID

TECHNICAL FIELD

The invention relates to liquid cleaning, and more particularly, it deals with an intermittent-action apparatus for filtering liquid and may be used for cleaning industrial effluents from slime, sewerage effluents from solids and for cleaning recirculation and potable water from suspended particles. In addition, the invention may also be used for separating products into liquid and solid phases and for cleaning water reservoirs and canals from sapropel.

BACKGROUND OF THE INVENTION

At present cleaning liquids and gases from various impurities and separating substances into fractions is a very actual problem. The problem of cleaning gases and effluuents is especially acute in the chemical and petrochemical industries, in the agriculture, at animal breeding farms, in the municipal activities and in ferrous and non-ferrous metallurgy.

Widely known in the art are apparatuses for filtering liquid and gaseous fluids, comprising a casing accommodating a filtering element and communicating with systems for supply of fluid being filtered, removal of filtrate and removal of precipitate, respectively. Depending on the fluid being filtered, filtering elements of great variety of design are used such as endless belts, nets, permeable membranes, and the like.

Known in the art is an apparatus for filtering a fluid (liquid) (cf. USSR Inventor's Certificate No. 117204, Cl. B 01 D 29/10, 1968) which is an intermittent-action apparatus having a casing accommodating a flexible filtering element in the form of a flexible bag-shaped container of a filtering material having one end thereof secured to the casing. The bottom of the container is connected by means of a pull member to a hoisting gear which is the means for turning the container inside out to remove the accumulated precipitate so that the container is movable with respect to the fixed portion thereof.

This apparatus is simple in structure but it is of a low throughput capacity since when a batch of liquid is admitted to the container the precipitate accumulated in the container and clogging the filtering surface hampers further filtering, and the container is to be frequently turned inside out so as to remove the precipitate, which takes much time.

SUMMARY OF THE INVENTION

The invention is based on the problem of providing an intermittent-action apparatus for filtering fluid which is so constructed that when the filtering surface of a flexible filtering element is clogged fresh portions of the filtering element can be brought into play for filtering and the surface of the filtering member can be reliably washed so as to improve throughput capacity of the filtering apparatus and facilitate operation.

This problem is solved by that in an intermittent-action apparatus for filtering liquid, comprising a casing communicating with systems for supplying fluid being filtered, removing the cleaned fluid and removing precipitate, respectively, and a flexible filtering element which is movable with respect to a portion thereof secured tothe casing, according to the invention, the casing is sealed and a hollow cylinder is installed in the casing to define therewith an annular space communicating with the system for removing precipitate, and the flexible filtering element comprises a hose having one end thereof secured to a driven drum mounted in the upper part of the casing and having a means for controlling the drum torque and the other end thereof which is turned inside out and secured along the perimeter to the hollow cylinder so as to define around the remaining part of the hose an annular space whose volume varies during accumulation of precipitate therein and during the movement of the hose under the action of the drum.

The hose end, which is turned inside out, is preferably secured to the outer periphery of the hollow cylinder.

The provision of the sealed casing makes it possible to build-up an increased pressure of liquid being filtered in the casing so as to contribute to acceleration of filtering. Securing the filtering hose to the hollow cylinder allows the end of the hose, which is secured to the driven drum, to move along the outer periphery of the cylinder and to be received in the lower annular space of the casing so as to permit most simple complete and rapid removal of precipitate from the hose surface during washing without making use of other means and mechanisms so as to reduce the down time of the apparatus.

To simplify design of the apparatus and to use liquid being filtered as washing liquid, the hollow cylinder preferably communicates with the system for supplying liquid being filtered and its periphery is perforated. The filtering hose can be thus washed through the whole thickness thereof.

According to the invention, a sleeve may be provided in the annular space of the hose coaxially with the hollow cylinder for movement together with the hose so as to improve throughput capacity or the filtering apparatus owing to cavitation of liquid flow moving through the annular space defined between the sleeve and hose.

When a filtering material (filler) is used, which is poured into the annular space of the hose, a vessel may be accommodated in the lower part of the sealed casing the vessel communicating, via pipes, with the upper part of the casing in which there is mounted a guide trough so that when the hose moves along the cylinder all filtering filler can be poured out into the vessel, washed and fed back through the pipes into the trough in the upper part of the casing for pouring back into the annular space of the filtering hose.

According to another embodiment of the invention, a hollow elastic ring communicating with a pneumatic system may be provided in the interior of the cylinder at the portion where the hose is secured, the ring allowing the cylinder interior space to be sealed -off during removal of precipitate thereby preventing the precipitate from getting into the system for removing the cleaned liquid.

Therefore, the apparatus according to the invention features high throughput capacity, is simple in structure, reliable in operation and convenient for maintenance.

BRIEF DESCRIPTION OF THE DRAWINGS

The invention will now be described with reference to specific embodiments thereof illustrated in the accompanying drawings, in which.

DETAILED DESCRIPTION OF THE INVENTION

Figure 1:
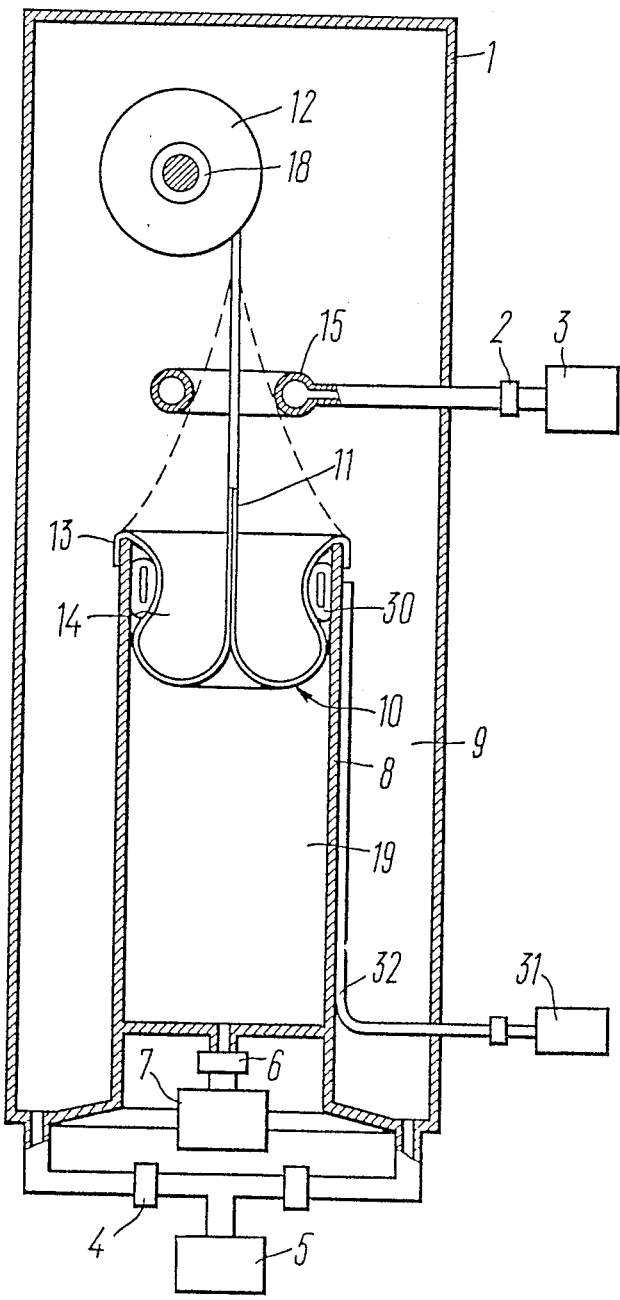
FIG. 1 schematically shows a longitudinal section view of an apparatus according to the invention.

An intermittent-action apparatus for filtering liquid comprises a sealed casing 1 (FIGS. 1 through 5) communicating, via a check valve 2, with a system 3 for supplying liquid being filtered, via a valve 4, with a system 5 for removing precipitate, and, via a valve 6, with a system 7 for removing the cleaned liquid.

The casing 1 accommodates a hollow cylinder 8 defining with the casing 1 an annular space 9 communicating with the system 5 for removing precipitate, and a flexible filtering hose 10.

The filtering hose 10 has one end 11 thereof which is secured to a driven drum 12 mounted in the upper part of the casing 1 and the other end 13 which is turned inside out and secured along the perimeter to the hollow cylinder 8 so as to define an annular space 14 around the remaining part of the hose, the liquid being filtered being admitted to this annular space 14 for filtering.

Owing to such attachment of the ends of the filtering hose 10, the latter is movable with respect to the portion thereof at which it is secured, and the resultant annular space 14 varies in volume during accumulation of precipitate therein and movement of the hose 10 under the action of the drum 12.

As shown in FIG. 1, the end 13 of the hose 10, which is turned inside out, is secured to the open end of the hollow cylinder 8 and is received in the interior space of the cylinder 8 so that an increase in volume of the annular space 14 under the action of precipitate accumulated therein or a decrease in volume of the annular space 14 when the hose is raised occurs within the cylinder. The lower part of the interior space of the cylinder 8 communicates with the system 7 for removing the cleaned liquid. An annular pipe 15 of the system 3 for supplying fluid being filtered is disposed above the cylinder 8, and the hose 10 extends through the annular pipe.

The end 13 of the hose 10 is secured to the outer periphery of the hollow cylinder 8 by any appropriate known means, e.g. by means of an adhesive, fasteners, and the like.

The end 11 of the hose 10 may be secured directly to the drum 12 or to a rigid ring 16 (FIGS. 2 through 5) to which are secured cables 17 wound on the drum 12.

Any known reversible drive comprising an electric motor and a clutch (note shown in the drawing) engageable with the shaft of the drum 12 for raising the filtering hose 10 and for lowering the filtering hose 10 if necessary may be used for rotating the drum 12. The drum 12 is also provided with a torque controlling element 18 for controlling its torque depending on a preset pressure exerted upon the hose by the liquid being filtered and by precipitate available in the annular space 14. This elements may comprise e.g., a ratchet or friction mechanism.

Depending on the adopted system of filtering or degree of liquid cleaning, the hose may be moved during filtering within an interior space 19 of the cylinder 8 as shown in FIG. 1 or along the outer periphery thereof as shown in FIGS. 2 through 5, in the annular space 9 of the casing 1.

Figure 3:
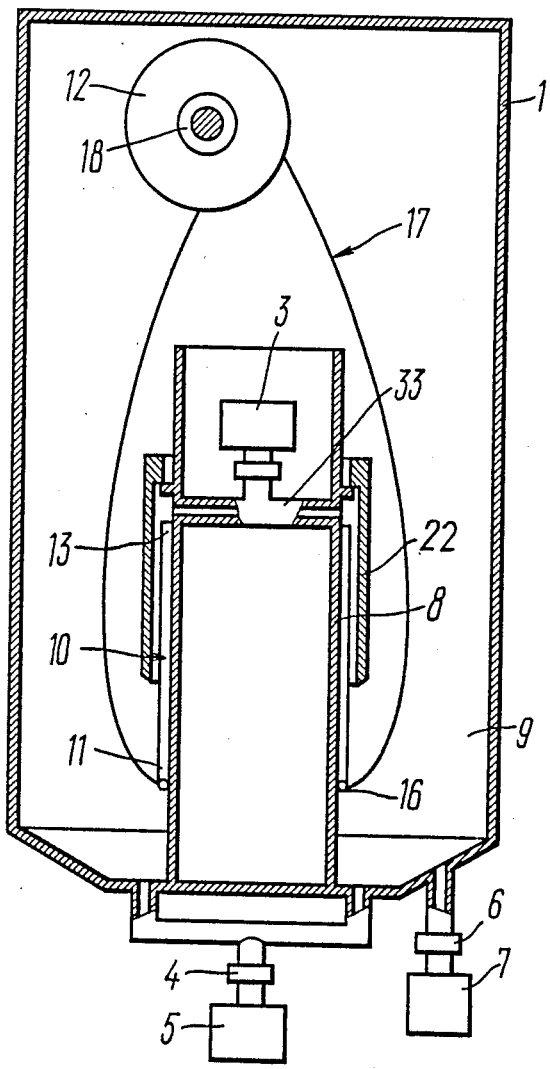
FIG. 3 is ditto of FIG. 2 with a flexible filtering hose shown in the washing position.
Figure 5:
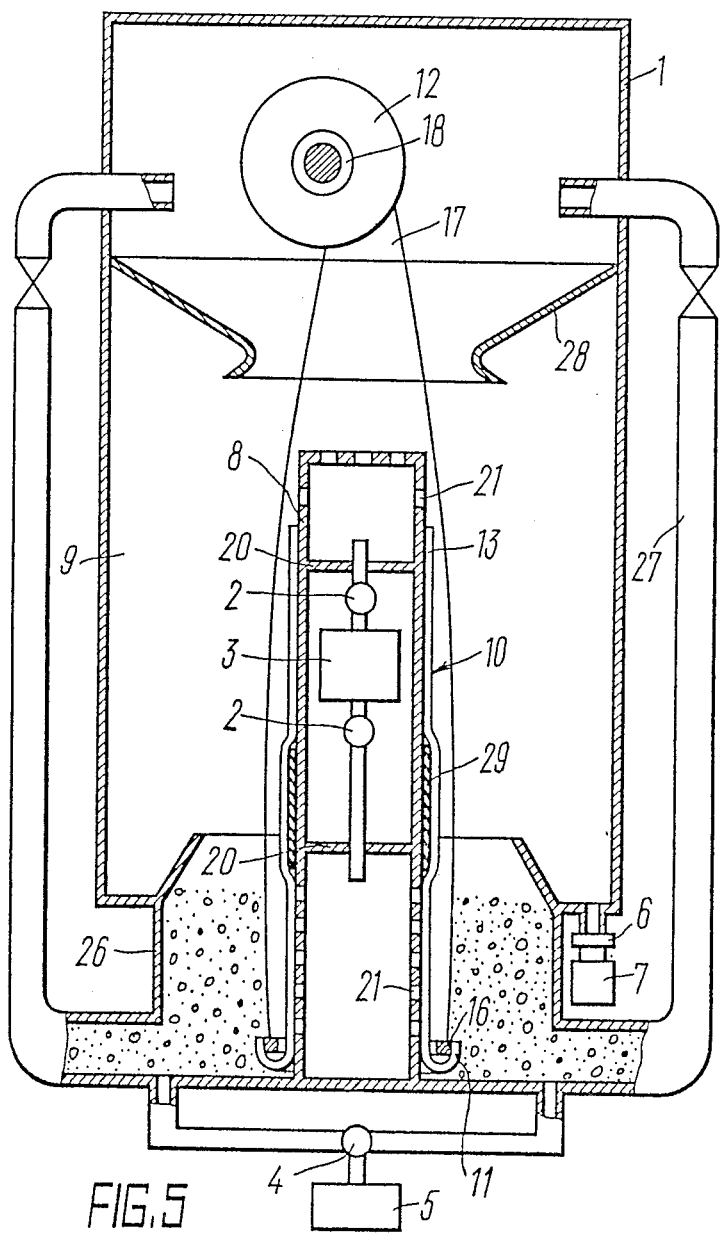
FIG. 5 is ditto of FIG. 4 with a flexible filtering hose shown in the washing position.

In all embodiments, when precipitate is removed from the annular space 14, the hose 10 moves along the outer periphery of the cylinder, the end 11 of the hose being received in the lower part of the casing as shown in FIGS. 3 and 5.

Figure 4:
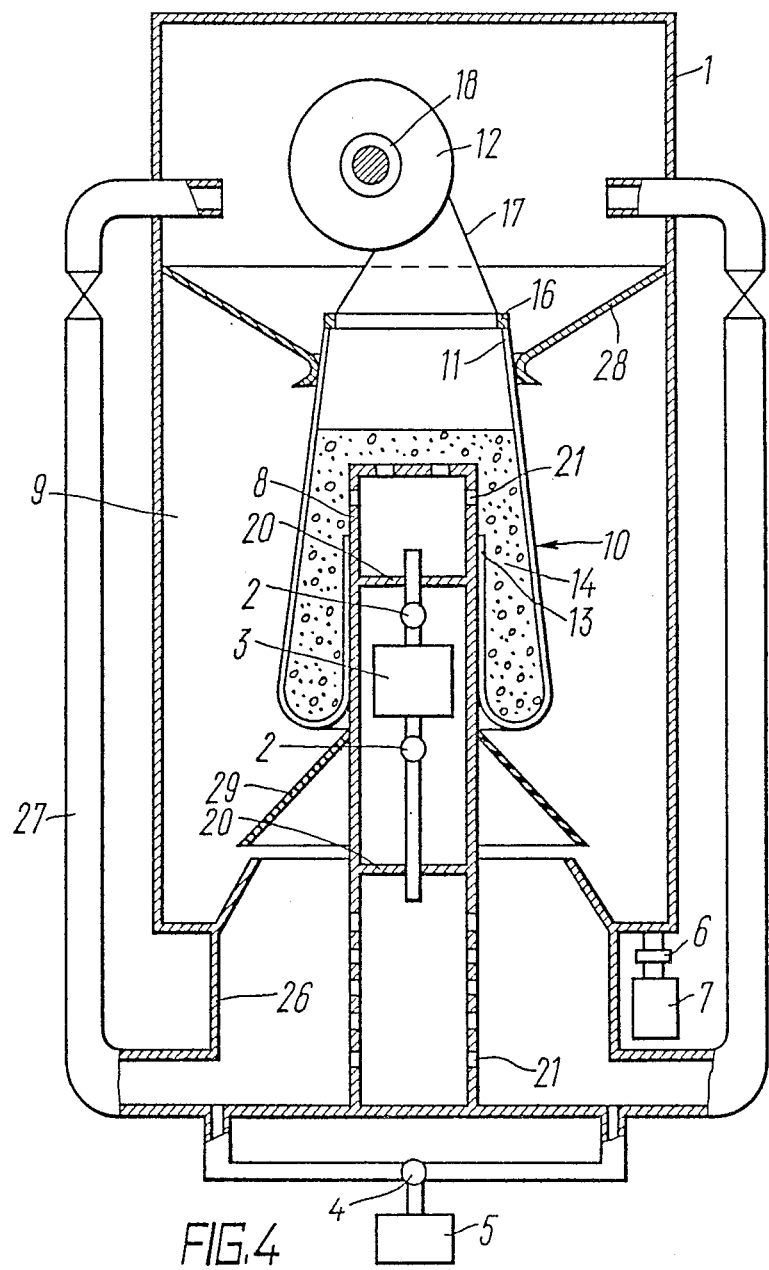
FIG. 4 is still another embodiment of an apparatus according to the invention.

Liquid being filtered may be supplied through the hollow cylinder 8 as shown in FIGS. 2 through 5. For that purpose, the system 3 for supplying liquid being filtered is accommodated in the interior space 19 of the cylinder 8, the interior space 19 being divided into compartments by partitions 20 (FIGS. 4, 5). The cylinder 8 is perforated at 21 for allowing liquid being filtered to escape.

To accelerate filtering, a sleeve 22 is provided in the annular space 14 (FIGS. 2,3) of the hose coaxially with the cylinder 8. The sleeve 22 is mounted in a spaced relationship with the cylinder 8 and with the end 13 of the hose 10 secured thereto, with a space 23 being defined therebetween so that the sleeve can move together with the hose 10 along the cylinder 8. An annular stop 24 is provided on the cylinder 8 and a shoulder 25 is provided on the sleeve to limit displacement of the sleeve 22.

Liquid may be filtered in the apparatus according to the invention using any known bulk filler such as sand, gravel, packing medium, fibers and the like. For that purpose, a vessel 26 may be provided in the lower part of the casing (FIGS. 4, 5) to communicate with the system 5 for removing precipitate. The bottom part of the vessel communicates through pipes 27 with the upper part of the casing through overflow valves. The filler (filtering material) is fed through the pipes 27 by any appropriate means to the upper part of the casing 1 wherein it is directed along a trough 28 to the annular space 14 of the hose 10. It should be noted that an elastic, e.g. rubber envelope 29 secured to the hollow cylinder 8 and covering the inlet opening of the vesel 26 is provided in the apparatus for directing the cleaned liquid to the system 7 communicating with the annular space 9. Owing to the elastic properties of the material, the envelope 29 will be pressed against the cylinder under the action of the hose containing the filler and liquid, which is turned inside out, so as to allow the end 11 of the hose to move down freely and to pour out the filler together with precipitate into the vessel 26 and to restore its shape again after the hose has been raised to the initial position.

In the embodiment shown in FIG. 1, the apparatus has a means for guiding the hose after filtering for turning the hose inside out on the outer periphery of the cylinder so that most complete removal of precipitate from the filtering surface and washing of the hose surface be ensured. This means is formed by hollow elastic ring 30 provided in the interior space of the cylinder 8 at the portion where the hose 10 is secured and communicating with a pneumatic system 31 by means of a flexible hose 32. Under the action of air pressure, the ring 30 increases in size and seals-off the cylinder 8 so that the hose, which has been raised to a position shown with dotted lines, will move along the outer periphery of the cylinder, the flexible hose 32 not obstructing the movement of the hose 10.

It will be understood that the apparatus according to the invention is provided with all necessary devices and electrical control systems ensuring its automatic operation, which are well known to those skilled in the art.

The apparatus according to the invention functions in the following manner.

The system 3 (FIG. 1) supplies liquid being filtered through the annular pipe 15 into the casing 1, and the liquid is admitted to the annular space 14 of the hose 10 and is filtered through the hose 10 while precipitate remains in the space 14. The cleaned liquid is fed to the system 7. As the filtering surface of the hose is clogged, precipitate and liquid being filtered accumulate in the annular space 14 and, when a pre-set pressure is built-up, the torque controlling element 18 will actuate so that the drum 12 will rotate, and the clogged portion of the hose surface will be lowered and moved away towards the inner periphery of the hollow cylinder 8, while clean surface of the hose will get to the filtering zone so as to result in an increase in the volume of the annular space 14 of the hose. After the drum has moved forward a length of the hose corresponding to the length of the cylinder, the drive of the drum 12 will be actuated to wind (take-up) the hose 10. After the hose has been raised to the position shown with dotted lines, compressed air is supplied to the elastic ring 30 to inflate it and to seal-off the interior space of the cylinder 8. The drum drive is then switched over to lower the hose so that the hose will be turned inside out and move down along the outer periphery of the cylinder under the action of precipitate available on its surface so that the end 11 of the hose will be received in the lower part of the casing. The precipitate will thus get to the exposed side of the hose 10. The precipitate will be washed off the hose surface by the liquid being filtered (or by a washing liquid) and will be fed to the system for removing precipitate. After washing the hose, the drum 12 starts rotating in the opposite direction so as to wind (take-up) the hose. When the hose 10 is raised, air is caused to escape from the elastic ring 30, the hose is lowered down into the interior space 19 of the cylinder 8, and the filtering cycle is repeated.

Figure 2:
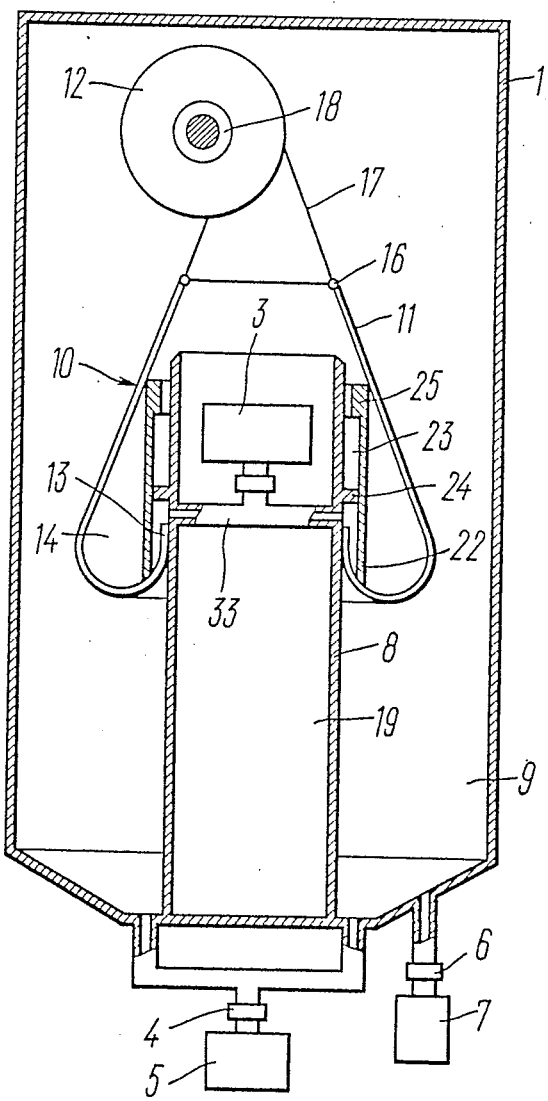
FIG. 2 is another embodiment of an apparatus.

The apparatus shown in FIGS. 2 and 3 functions in the following manner.

Liquid being filtered is supplied from the system 3 through a pipe 33 installed in the cylinder 8 and is admitted to the annular space 14 through the annular space 23 between the sleeve 22 and the end 13 of the hose secured to the outer periphery of the cylinder 8 and is filtered through the hose, the clean portions of the hose being moved forward during filtering as described above with reference to FIG. 1. After the valve 6 has been closed and the end 11 of the hose will be lowered with the ring 16 to the lowermost position, i.e. when the hose 10 has been completely turned inside out on the outer periphery of the cylinder 8 (FIG. 3), the valve 4 will open, and liquid with precipitate will be fed to the system 5. It should be noted that jets of liquid being filtered (or washing liquid) will flow through the annular space 23 to wash precipitate off the hose surface. The valve 4 will then close, and the valve 6 will open. The drum 12 starts rotating in the opposite direction, and the end 11 of the hose will start rising together with the sleeve 22 so that the annular space 14 will be formed again, and the volume of this space will increase. Liquid being filtered is again admitted to the space 14, and the filtering cycle is repeated.

The apparatus shown in FIGS. 4, 5 functions in the same manner as that described with reference to Figures 2, 3. It should be noted that, concurrently with lowering of the end 11 and unfolding the hose 10 along the outer periphery of the cylinder 8, the envelope 29 is pressed against the cylinder 8, and filler and precipitate are poured out of the space 14 into the vessel 26. Liquid being filtered (or washing liquid) passes through the perforation 21 of the lower part of the cylinder 8 and through the hose to clean it. Then the end 11 of the hose 10 is caused to rise back to the initial position by rotating the drum 12 as shown in Figure 4. Precipitate together with the liquid is removed into the system 5, and the cleaned filler is fed along the pipe 27 to the upper part of the casing and is poured over through the trough 28 to the annular space 14 that has been formed again. Fluid being filtered is admitted to the annular space 14 through the perforation 21 in the upper part of the cylinder to pass through the filler and hose and is directed through the envelope 29 to the system 7.

INDUSTRIAL APPLICABILITY

The invention may be most effectively used for cleaning industrial effluents from slime, sewerage effluents from solids, recirculation and potable water from suspended particles. The invention may also find application for separating effluents from animal breeding farms into solid and liquid phases and also for cleaning canals and water basins from sapropel.

We claim:

1. An intermittent-action apparatus for filtering liquids, comprising:
   a sealed casing having a feed means that can communicate with a system for supplying liquids to be filtered;
   a hollow cylinder arranged in said casing so as to define an annular space positioned below feed means, said cylinder having an inner surface, an outer surface, an open mouth region and a closed bottom region;
   a precipitate removal system communicating with a bottom portion of said annular space;
   a clean liquid removal system communicating with said bottom region of said hollow cylinder; and
   a flexible filtering
   element, having an open ended substantially cylindrical shape, said element being moveable within said casing, and having a first end secured to said hollow cylinder and a second end connected to a pulley system mounted above said cylinder,
   a portion of said filter element being adaptable to be positioned inside said hollow cylinder to define an interior filter element volume opening toward said open mouth region and in flow communication with said feed means, a drive
   means for rotating said pulley to an extent sufficient to discharge accumulated precipitate from said interior volume into the annular space.--

2. An apparatus according to claim 1, wherein said feed means comprises an annular pipe so as to ensure a uniform flow of the liquid to the cylinder.

3. An apparatus according to claim 2, wherein the flexible filtering element is secured to the outer surface of the hollow cylinder.

4. An apparatus according to claim 3, wherein at least one inflatable ring, connected to an air supply system, is positioned on the inner surface of said cylinder so as to obstruct the open mouth region of the cylinder when the ring is inflated.

5. An intermittent-action apparatus for filtering liquids, comprising:
   a hollow comprising arranged in a casing so as to define an annular space between said cylinder and said casing, said cylinder having an inner surface, an outer surface, an open mouth region and a closed bottom region;

a means to feed liquids to be filtered, positioned within the inner surface of the cylinder, that can communicate with a system for supplying liquids to be filtered;

a slidable sleeve co-axially positioned around the cylinder so as to form a circular gap space between the sleeve and the cylinder, said circular gap space communicates with said feed means;

a flexible filtering element, and having an open ended substantially cylindrical shape, said element being moveable within said casing and having a first end secured to the outer surface of said hollow cylinder and a second end attached to a ring that is connected to a pulley system mounted above said secured first end being located below said means to feed liquids, said filter element being in a filtering position when said ring is in an upper position and said filter element being in a precipitate removal position when said ring is a position lower than said upper position; drive means for rotating said pulley to an extent sufficient to move said ring and filter element from its filtering position to its precipitate removal position;

a precipitate removal system and valve assembly communicating with said annular space; and a clean liquid removal system and valve assembly communicating with said annular space, the operation of said precipitate removal system and said clean liquid removal system is dependent on the position of the filtering element.

6. An apparatus according to claim 5, wherein the feed means is connected to a pipe that communicates with at least one opening in the cylinder so as to supply the liquid to the circular gap space.

7. An apparatus according to claim 6, wherein the
hollow cylinder has an annular stop on its outer surface located above said first end and the sleeve has a shoulder that engages the annular stop so as to limit the travel of the sleeve along the cylinder.

8. An intermittent-action apparatus for filtering liquids comprising:

a hollow cylinder arranged in a casing so as to define an annular space between said cylinder and said casing, said cylinder having an inner surface, an outer surface, an open mouth region and a bottom portion;

a means to feed liquids to be filtered, positioned within the inner surface of the cylinder, that can communicate with a system for supplying liquids to be filtered;

a flexible filtering moveable within said casing and having a first end secured to element, having an open ended substantially cylindrical shape, said element being moveable within said casing and having a first end secured to the outer surface of said cylinder and a second end attached to a ring that is connected to a pulley system mounted above said cylinder, said filter element being in a filtering position when said ring is in an upper position and said filter element being in a precipitate removal position when said ring is a position lower than said upper position; drive means for rotating said pulley to an extent sufficient to move said ring and filter element from its filtering position to its precipitate removal position; drive means so that the position and volume of a circular space, defined by an interior surface of the filtering element when said filtering element does not completely rest against the cylinder, can be varied to discharge accumulated precipitate to the annular a recyclable filler material being supported by said filter element when said element is in the filtering position.

a precipitate removal system and valve assembly communicating with said annular space; and a clean liquid removal system and valve assembly communicating with said annular space, the operation of said precipitate removal system and said clean liquid removal system is dependent on the position of the filtering element.

9. An apparatus according to claim 8, wherein the feed means is arranged within the inner space of the cylinder between at least one partition and an end of said hollow cylinder so as to divide the interior space of the hollow cylinder into compartments.

10. An apparatus according to claim 9, wherein the bottom portion of the hollow cylinder is provided with at least one hole for expelling the liquid being filtered.

11. An apparatus according to claim 10, wherein the bottom part of the casing is provided with a vessel communicating with the precipitate removal system and surrounding the bottom portion of the hollow cylinder, said vessel has an inlet opening that is closed by a flexible skirt mounted to said hollow cylinder when the filter element is in the filtering position and is open when the filter is in the precipitate removal position, and wherein at least one pipe means, connected to the vessel, communicates with a top part of the casing for delivering the liquid to be filtered to the filter in the filtering position.

12. An apparatus according to claim 11, wherein the top part of the casing is provided with a trough, arranged under an outlet opening of the pipe means, so as to recycle the filler material to the filter element when the filter element is in the filtering position.

* * * * *